United States Patent
Varghese et al.

(10) Patent No.: US 8,965,866 B2
(45) Date of Patent: Feb. 24, 2015

(54) OPTIMIZING DATA TRANSFER TIME ON GRAPHICS PROCESSOR UNITS

(75) Inventors: Lal Samuel Varghese, Bangalore (IN); Babu Alagarsamy, Bangalore (IN); Shwetha Kailasanath, Bangalore (IN); Arun Velmurugan, Bangalore (IN)

(73) Assignee: Business Objects Software Limited, Dublin (IE)

( * ) Notice: Subject to any disclaimer, the term of this patent is extended or adjusted under 35 U.S.C. 154(b) by 455 days.

(21) Appl. No.: 12/640,463

(22) Filed: Dec. 17, 2009

(65) Prior Publication Data
US 2011/0153548 A1    Jun. 23, 2011

(51) Int. Cl.
G06F 7/00         (2006.01)
G06F 17/30        (2006.01)

(52) U.S. Cl.
CPC ...... *G06F 17/30592* (2013.01); *G06F 17/3048* (2013.01); *G06F 17/30501* (2013.01)
USPC ........................................ 707/705

(58) Field of Classification Search
USPC .................... 707/755, 705, 999.101, 999.102
See application file for complete search history.

(56) References Cited

U.S. PATENT DOCUMENTS

| | | | | |
|---|---|---|---|---|
| 5,544,283 | A * | 8/1996 | Kaufman et al. | 345/424 |
| 5,767,854 | A * | 6/1998 | Anwar | 715/848 |
| 6,301,579 | B1 | 10/2001 | Becker | |
| 6,671,680 | B1 * | 12/2003 | Iwamoto et al. | 707/737 |
| 7,761,407 | B1 * | 7/2010 | Stern | 707/602 |
| 7,814,142 | B2 * | 10/2010 | Mamou et al. | 709/203 |
| 7,814,470 | B2 * | 10/2010 | Mamou et al. | 717/162 |
| 8,095,499 | B2 * | 1/2012 | Thanu | 707/607 |
| 8,108,399 | B2 * | 1/2012 | Dumitru et al. | 707/741 |
| 8,160,996 | B2 * | 4/2012 | Lo et al. | 707/600 |
| 8,204,901 | B2 * | 6/2012 | Pimpale et al. | 707/769 |
| 2004/0103092 | A1 * | 5/2004 | Tuzhilin et al. | 707/3 |
| 2006/0085445 | A1 * | 4/2006 | Thanu | 707/100 |
| 2007/0061542 | A1 * | 3/2007 | Uppala | 711/173 |
| 2007/0219957 | A1 * | 9/2007 | D'Hers et al. | 707/3 |
| 2007/0233536 | A1 * | 10/2007 | Johnson et al. | 705/7 |
| 2007/0245119 | A1 * | 10/2007 | Hoppe | 711/216 |

(Continued)

FOREIGN PATENT DOCUMENTS

WO      WO 02/03251 A2      1/2002

OTHER PUBLICATIONS

MicroStrategy 8™, Advanced Reporting Guide, Tenth Edition, Jul. 2005, version 8.0.1, published by MicroStrategy Incorporated, pp. xxii, 10, 15-16, 18, 33-35, 45, 106-107, 141-142, 169, 171, 173, 176, 180, 182, 196, 362, 532-533.*

(Continued)

*Primary Examiner* — Hosain Alam
*Assistant Examiner* — Eliyah S Harper

(57) ABSTRACT

Disclosed are methods and systems for optimizing data transfer time in a graphics processor unit. The methods and systems involve receiving a user request to perform online analytical processing computation, the user request comprising axes dimensions and filter dimensions associated with a visualization for an online analytical computation cube, identifying one or more slices of the online analytical processing cube based on the user request, transferring the one or more identified slices to a second memory, performing the online analytical processing computation for the one or more identified slices at the graphics processor unit and retrieving a result of the online analytical processing computation from the second memory.

15 Claims, 9 Drawing Sheets

(56) References Cited

U.S. PATENT DOCUMENTS

| | | | | |
|---|---|---|---|---|
| 2008/0288524 | A1* | 11/2008 | Dumitru et al. | 707/102 |
| 2008/0301541 | A1* | 12/2008 | Karidi | 715/206 |
| 2009/0217147 | A1* | 8/2009 | Thomsen | 715/214 |
| 2009/0292718 | A1* | 11/2009 | Cuneo et al. | 707/101 |
| 2010/0070904 | A1* | 3/2010 | Zigon et al. | 715/771 |
| 2010/0198777 | A1* | 8/2010 | Lo et al. | 707/601 |
| 2011/0055149 | A1* | 3/2011 | Pimpale et al. | 707/602 |

OTHER PUBLICATIONS

Weyerhaeuser et al., Exploiting Graphic Card Processor Technology to Accelerate Data Mining Queries in SAP NetWeaver BIA, Dec. 15-19, 2008, Data Mining Workshops, 2008. ICDMW '08. IEEE International Conference, pp. 506-515.*

Wikipedia; Translation Lookaside Buffers; Jul. 12, 2013; Wikipedia (http://en.wikipedia.org/wiki/Translation_lookaside_buffer).

European Search Report for EP Application No. 10013980.7-1952, mailed Jul. 25, 2013, 09 pages; EPO, Munich, Germany.

European Search Report for EP Application No. 10013980.7-2201, mailed Mar. 3, 2011, 9 pages; EPO, Munich, Germany.

Ke Yang et al; I3DC: Interactive Three-Dimensional Cubes; ICDE '09—IEEE 25th International Conference on Data Engineering, 2009—pp. 1475-1478; IEEE, Piscataway, NJ, USA; Mar. 2009; ISBN: 978-1-4244-3422-0.

Elmqvist N et al; ZAME: Interactive Large-Scale Graph Visualization; PACIFICVIS'08—IEEE Pacific Visualization Symposium, 2008—pp. 215-222; IEEE, Piscataway, NJ, USA; Mar. 2008; ISBN: 978-1-4244-1966-1.

Christoph Weyerhaeuser et al; Exploiting Graphic Card Processor Technology to Accelerate Data Mining Queries in SAP NetWeaver BIA; ICDMW '08—IEEE International Conference on Data Mining Workshops, 2008—pp. 506-515; IEEE, Piscataway, NJ, USA; Dec. 2008; ISBN: 978-0-7695-3503-6.

Jedox AG; Palo GPU—Overview, 2010; Jedox UK Limited, Oxfordshire (http://www.jedox.com/en/products/Palo-GPU-overview.html).

* cited by examiner

| GEOGRAPHY | PRODUCT | TIME | DIST. CHANNEL | SALES REVENUE |
|---|---|---|---|---|
| USA | KEYBOARD | JAN. 2008 | ONLINE | $ 5,000 |
| | | | RETAIL | $ 3,000 |
| | | FEB. 2008 | ONLINE | $ 6,000 |
| | | | RETAIL | $ 5,000 |
| | | MAR. 2008 | ONLINE | $ 4,000 |
| | | | RETAIL | $ 3,000 |
| | MOUSE | JAN. 2008 | ONLINE | $ 1,000 |
| | | | RETAIL | $ 2,400 |
| | | FEB. 2008 | ONLINE | $ 1,200 |
| | | | RETAIL | $ 2,300 |
| | | MAR. 2008 | ONLINE | $ 1,100 |
| | | | RETAIL | $ 2,800 |
| CANADA | KEYBOARD | JAN. 2008 | ONLINE | $ 4,000 |
| | | | RETAIL | $ 2,500 |
| | | FEB. 2008 | ONLINE | $ 5,000 |
| | | | RETAIL | $ 4,000 |
| | | MAR. 2008 | ONLINE | $ 3,000 |
| | | | RETAIL | $ 2,500 |
| | MOUSE | JAN. 2008 | ONLINE | $ 1,300 |
| | | | RETAIL | $ 2,700 |
| | | FEB. 2008 | ONLINE | $ 1,800 |
| | | | RETAIL | $ 2,100 |
| | | MAR. 2008 | ONLINE | $ 1,800 |
| | | | RETAIL | $ 2,400 |
| MEXICO | KEYBOARD | JAN. 2008 | ONLINE | $ 3,500 |
| | | | RETAIL | $ 4,500 |
| | | FEB. 2008 | ONLINE | $ 4,200 |
| | | | RETAIL | $ 5,800 |
| | | MAR. 2008 | ONLINE | $ 3,800 |
| | | | RETAIL | $ 6,200 |
| | MOUSE | JAN. 2008 | ONLINE | $ 1,900 |
| | | | RETAIL | $ 2,600 |
| | | FEB. 2008 | ONLINE | $ 1,700 |
| | | | RETAIL | $ 3,300 |
| | | MAR. 2008 | ONLINE | $ 2,400 |
| | | | RETAIL | $ 3,500 |

FIG. 3A

OPTIMIZING DATA TRANSFER TIME ON GRAPHICS PROCESSOR UNITS

TECHNICAL FIELD

The field generally relates to data transfer time optimization and more specifically to online analytical processing (OLAP) computations on graphics processor units (GPU).

BACKGROUND

A GPU is a specialized processor. It serves as a co-processor to a central processing unit (CPU) assisting to create graphics for display. A GPU normally has a highly parallel structure, efficient floating point operations and dedicated memory making it suitable for creating three dimensional graphics. GPUs have been used to do more than create graphics. In OLAP there is an increasing demand for near real-time interactive visualization of analytical data using in-memory analysis techniques. Most performance-enhancing techniques in multi-dimensional databases involve pre-aggregation. That is aggregation or sub-aggregation are stored, which enable response times to queries. Generally a GPU is used for performing OLAP computations as GPUs are suited for repetitive calculations required in OLAP. However, GPU has a limited memory and it is not possible to fit a cube in the memory of the GPU. Hence, every time an OLAP computation is to be performed the contents of the cube, or its in-memory portion, has to be transferred to the memory of the GPU and the result has to be transferred back after the computation. When this is done in a near real-time interactive visualization scenario, the time taken for data transfer to the GPU starts dominating the actual time for the computation, thus negating much of the advantage in making the calculations in the GPU. Hence it is important to reduce the data transfer time to get maximum interactivity from the visualization.

SUMMARY

Disclosed are methods and systems for optimizing data transfer time. The methods and systems involve receiving a user request to perform online analytical processing computation, the user request comprising axes dimensions and filter dimensions associated with a visualization for an online analytical processing cube, identifying one or more slices of the online analytical processing cube based on the user request, transferring the one or more identified slices to a second memory, performing the online analytical processing computation for the one or more identified slices at a GPU and retrieving a result of the online analytical processing computation from the second memory.

In one embodiment, the online analytical processing cube is stored in a first memory of a computer system. The second memory is a memory in the GPU. An OLAP application may be used to retrieve data from the OLAP cube.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 3A is an exemplary business scenario for optimizing data transfer time in a graphics processor unit according to an embodiment of the invention.

DETAILED DESCRIPTION

Figure 1A:
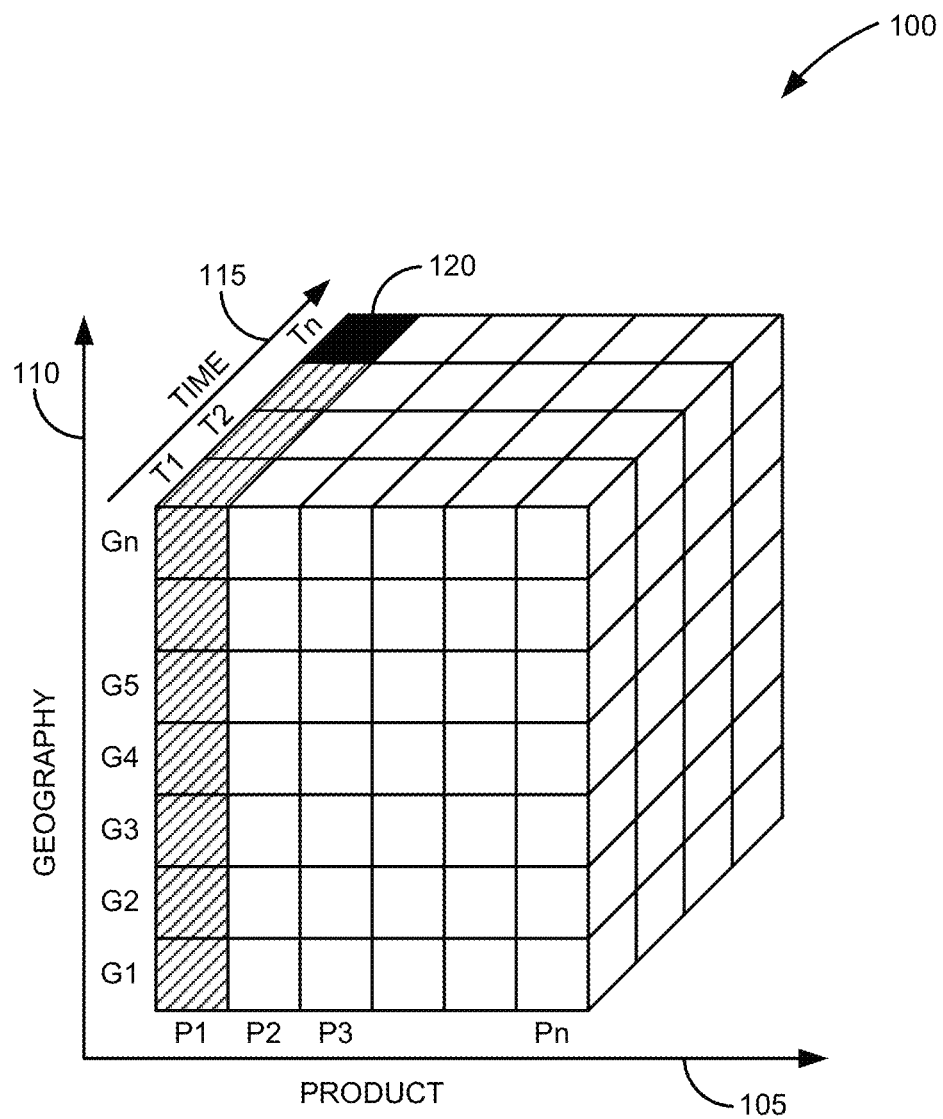
FIG. 1A illustrates an exemplary OLAP cube according to an embodiment of the invention.

Embodiments of techniques for optimizing data transfer time on graphics processor units are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

OLAP refers to a type of data source and associated tools. Business intelligence tools include OLAP tools. OLAP generally refers to a technique of providing fast analysis of shared multi-dimensional information stored in a database. OLAP systems are used for report generation and are suited to ad hoc analyses. An OLAP cube normally includes several dimensions and measures. The data in an OLAP data source is multi-dimensional and is partially or fully pre-aggregated. Also called cubes or hyper-cubes, these data sources provide a conceptual view of data, including full support for hierarchies and multiple hierarchies. The multi-dimensional schema means redundant information is stored, but it allows for users to initiate queries without the need to know how the data is organized. Also, OLAP data sources can have faster response times than relational databases. This framework also finds use because it is a logical way to analyze businesses and organizations. In some OLAP tools the data is arranged in a schema which simulates a multi-dimensional schema. The results of an OLAP query are often displayed in a cross tabulation, or cross-tab. In a cross-tab the dimensions form the rows and columns of the matrix while the measures are the values. There are a number of commercially available OLAP tools including SAP BusinessObjects Voyager™ which is available from SAP Americas of Palo Alto, Calif., US.

A dimension represents a group of one or more enumerable business objects like products, people, financial elements, and time. A dimension may be hierarchical, e.g., time includes years, quarters, months, and days. A business object need not relate to a commercial enterprise, as such, and can be related to governance, social science, engineering, science and the like. A measure is a quantity as ascertained by comparison with a standard, usually denoted in some metric, for example, units sold and dollars. A measure, such as sales revenue, can be displayed for dimension customer, product and geography. A measure may be a quantity that is determined by comparison with a standard, usually denoted in some metric, like "units sold". A measure may be a resultant of an aggregation of identical measures for a dimension. For instance, measure "revenue" may be displayed for dimension "time". Here, the measure describes an aggregation of all the revenues for all the years. A measure can also be displayed as a value for each of the members within a dimension. A value may be described as a quantity (for example, numeric quantity). For instance, for the attribute "sales revenue: $1000", the value is "1000".

In the domain of OLAP, there is an increasing demand for near real-time interactive visualization of analytical data using in-memory analysis techniques. In interactive visualization, a user is able to select and view the dimensions and measures of the OLAP cube using visualization, such as, a cross-tab or a chart. The visualizations may be two dimensional or three dimensional. The visualizations show data in a corresponding viewport. The viewport could be depicted as a data grid, chart, or a portion of either bounded by the available screen size, or some other imposed restriction. Though OLAP cube includes several dimensions and cells, once a viewport is fixed, only a part of the OLAP cube is of user's interest. The selection of a viewport fixes a sub-set of the dimensions as axes for the visualization. In the interactive visualization, performing OLAP computations such as aggregation (e.g., Sum, Average, Max, Last) on a user request is an important aspect. Aggregating a measure along one or several dimensions is the act of determining an overall value of this measure for sets of members of these dimensions. For instance, Revenue could be aggregated by cities or whole countries or by days or quarters. For each dimension that "governs" it, a measure may also specify how values are "aggregated" along the members of the dimension. For instance, it can be specified that the measure "Inventory" aggregates by a sum on Geography (the inventory for a given product in a country at a point in time is the sum of the inventories for all its cities) and on Product (the inventory for a group of products is the sum of inventories for each product in this group), but aggregates on "last" along the time dimension (the inventory for a product for the year is the inventory at the end of the last day of this year). A set of measures with same dimensionality can be grouped into a set, called a Dimension of Measures, which behaves just like a dimension. Together with the dimensions that define its dimensionality, a Dimension of Measures defines a Cube.

For the purpose of aggregation, the user may typically select two or three dimensions of the OLAP cube for analysis purposes. When the user selects three dimensions, the selected dimensions are presented on a user interface screen along the x-axis, y-axis and z-axis. For example, consider an OLAP cube having dimensions namely time, products and geography and a measure of sales revenue. The user may select two dimensions namely products and geography as axes dimensions in a two dimensional visualization. The unselected dimension, time, is considered as a filter dimension. A visualization tool presents the values for products and geography as a two dimensional cross-tab or chart in the viewport of the user interface. Based on the two dimensional presentation, the user will be able to analyze revenues for different products in different geographic locations. The user can manipulate the controls, for example to drill down to perform more detailed analysis of the sales revenue. Alternatively the user can redefine the viewport, for example, resize or move. When drilling down to perform more detailed analysis of the sales revenue the user can slice the OLAP cube according to his interest. A slice is a subset of a multi-dimensional array corresponding to a single member for each of the dimensions not in the subset. The slice often refers to a two-dimensional array selected from the OLAP cube. In this scenario the user has sliced the OLAP cube according to product and geography. The intersection of the viewport and the slice defines a view slice.

For OLAP computations, GPU is suited to perform repetitive calculations involved in aggregating all the cells in a cube or sub-cube in parallel. The GPU is a specialized processor meant for accelerating graphics processing on devices like personal computers, game consoles and graphics workstations. These processors have massively parallel processing power and are increasingly used to implement many complex algorithms outside of the graphics domain. They usually have Single-Instruction Multiple-Data (SIMD) or Multiple Instruction stream, Multiple Data stream (MIMD) architecture. SIMD architecture and MIMD architecture includes more than one memory which helps in speeding up the processing power. The processing power of the GPU may be combined with in-memory analysis techniques to afford near real-time visualization of larger cubes with more dimensions and more complex ad hoc queries.

An implementation of performing OLAP computations using a GPU will involve transferring parts of the OLAP memory cube required for an OLAP computation to a device memory in the graphics processor unit. The OLAP computation is performed in a processor of the GPU and the result obtained from the computation is made available to the CPU, for example, transferred back to the CPU memory. Transferring parts of the OLAP memory cube may involve transferring slices of the OLAP cube associated with the OLAP computations. In the further embodiments the CPU memory and the device memory are illustrated as first memory and second memory respectively.

FIG. 1A illustrates an exemplary OLAP cube according to an embodiment of the invention. Consider a business scenario 100 where a user is interested in a detailed analysis of sales revenue for a product across different geographic locations based on time. In business scenario 100, product, geographic location and time are the x-axis 105, y-axis 110 and z-axis 115 respectively. Let the products along the x-axis 105 be $P_1$, $P_2, P_3 \ldots P_n$. Let the geographic locations along the y-axis 110 be $G_1, G_2, G_3 \ldots G_n$. Let the time along z-axis 115 be $T_1, T_2, T_3 \ldots T_n$.

Consider the user is interested in detailed analysis of product $P_1$ across different geographic locations during a specific period of time. The user selects product and geographic location as axes dimensions and time as filter dimension. The shaded portion of the cube shows the slice which contains data of product $P_1$ across different geographic locations according to the user selection. On applying the time $T_n$ as filter dimension, the user is interested in detailed analysis of product $P_1$ in geographic location $G_1$ and for time $T_n$, then the data in portion 120 is used. This is a filtered slice.

Figure 1B:
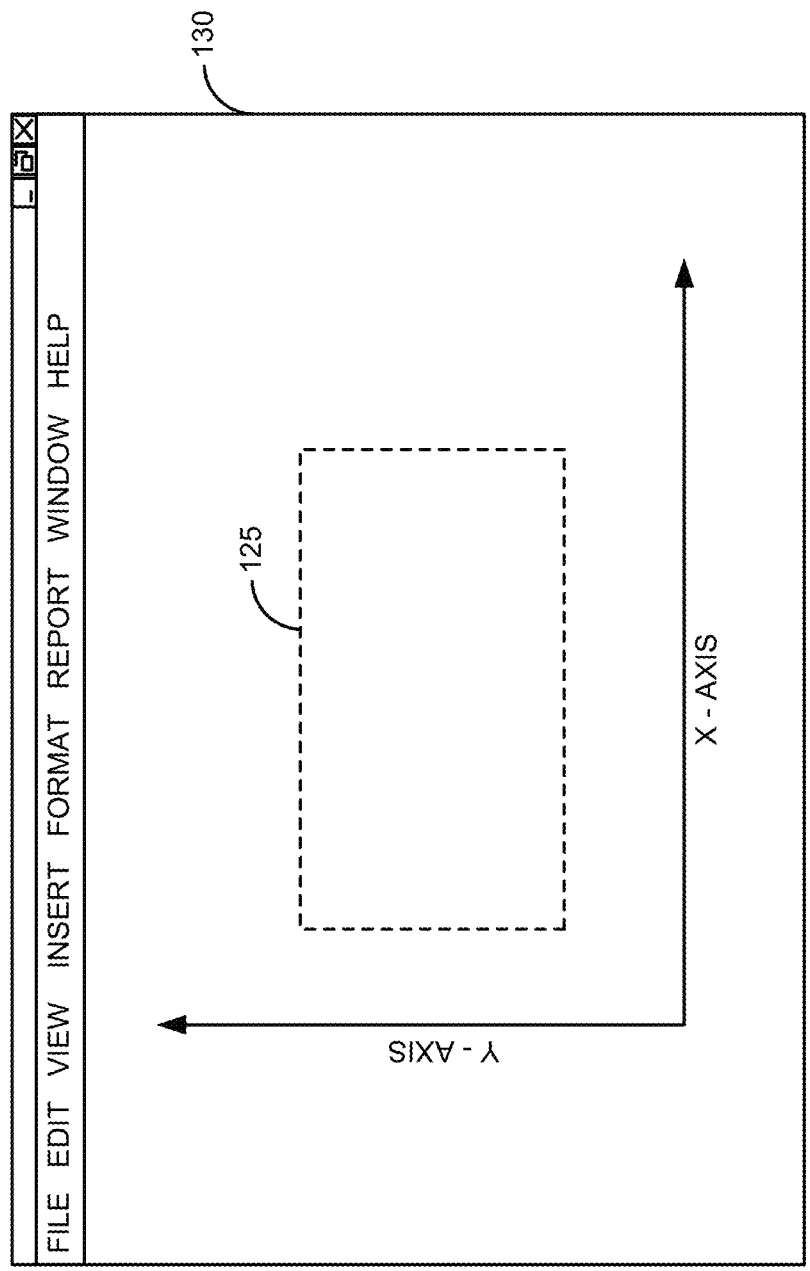
FIG. 1B illustrates an exemplary viewport for a cube according to an embodiment of the invention.

FIG. 1B illustrates an exemplary viewport for a cube according to an embodiment of the invention. The user may request the visualization of the portion 120 of the OLAP cube to be displayed on a viewport 125 along the x-axis and y-axis displayed in a user interface 130. The viewport depends on the axes dimensions selected by the user. The viewport also depends on any limit on the axes imposed by the display, the user, configuration, the client or the like. The limitations on the axis define how much of a cross-tab or a chart is seen. The limitation can be by range of values or member selection. The limitations include upper limit and lower limit of the x and y axes for the viewport. When the user changes the axes dimensions the viewport also changes accordingly. Once the viewport is fixed, only a subset of the OLAP cube is of interest for the purpose of near real-time visualization. Once the user selects the axes dimensions and has locked on to a viewport, the corresponding view slices are moved to the device memory immediately. The view slice is a portion of the slice displayed in the viewport. The view slices are transferred even before the user has specified to perform computations, to minimize the transfer latency to second memory. Once the view slices are moved to the second memory, they could be used for any number of computations until the user changes either the axes dimensions or the viewport. In an embodiment when the viewport size is increased an additional buffer required to increase the size of the viewport is transferred to the second memory.

Figure 2A:
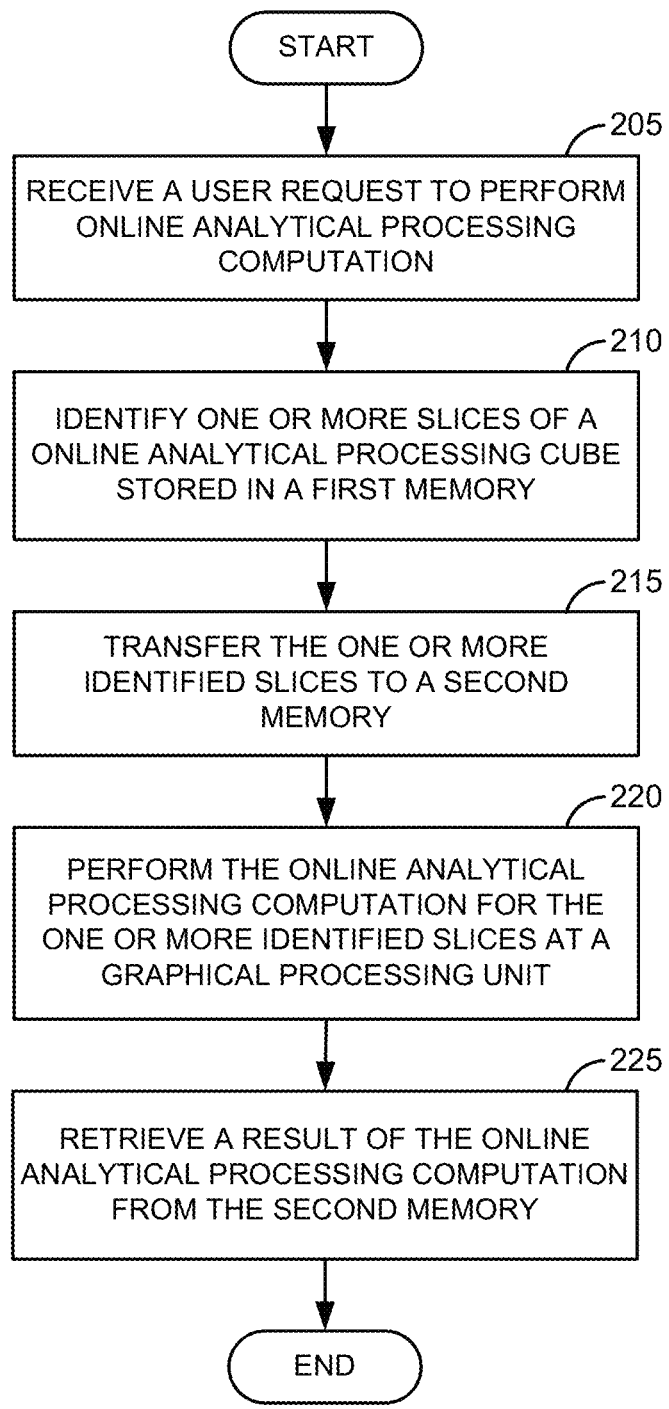
FIG. 2A is a flow diagram illustrating an exemplary method for optimizing data transfer time in a graphics processor unit according to an embodiment of the invention.

FIG. 2A is a flow diagram illustrating an exemplary method for optimizing data transfer time in a graphics processor unit according to an embodiment of the invention. At process block 205, a user request to perform online analytical processing computation is received. The user request includes dimensions associated with a visualization for an online analytical processing cube. The dimensions in the user request are used as axes dimensions and filter dimensions. The user request also includes measures associated with the dimensions. In an embodiment, the OLAP computation is an aggregation. At process block 210, based on the user request one or more slices of an OLAP cube associated with the OLAP computation are identified. The one or more slices are identified based on the axes dimensions and filter dimensions requested by the user. The OLAP cube is stored in a first memory of a computer system. At process block 215, the one or more identified slices are transferred to a second memory. The addresses of the one or more identified slices that are transferred to the second memory are stored in the first memory. In an embodiment, the addresses are stored in a hash map table at the first memory. At process block 220, OLAP computation for the one or more identified slices are performed at the GPU. The OLAP computation may be performed at a processor of the GPU. In this scenario, the OLAP computation performed is aggregation. Therefore, the one or more identified slices are aggregated. The result obtained from the OLAP computation is stored in the second memory. At process block 225, a result of the OLAP computation is retrieved from the second memory. In an embodiment, the result of the OLAP computation is displayed in the viewport of the user interface.

Figure 2B:
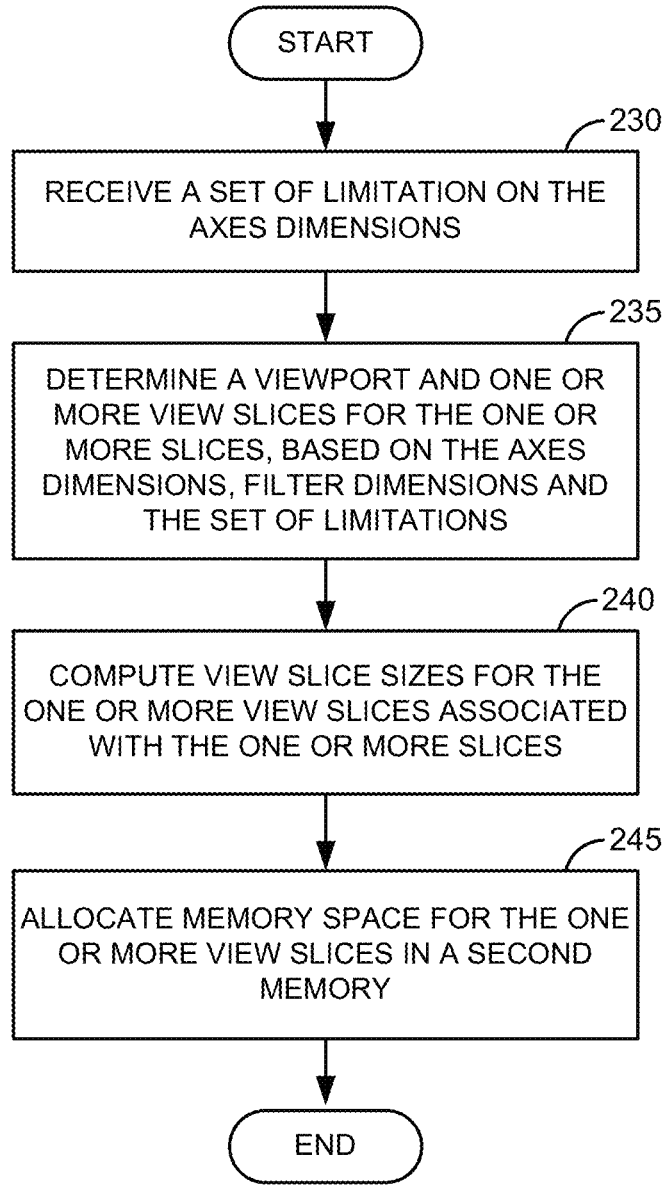
FIG. 2B is a flow diagram illustrating an exemplary method for identifying one or more slices associated with the OLAP computation according to an embodiment of the invention.

FIG. 2B is a flow diagram illustrating an exemplary method for identifying one or more slices associated with the OLAP computation according to an embodiment of the invention. At process block 230, a set of limitation on the axes dimensions is received. The set of limitations is associated with the visualization. The limitations include upper limit and lower limit of the x and y axes for the viewport. At process block 235, a viewport and one or more view slices for the one or more slices is determined based on the axes dimensions, filter dimensions and the limitations imposed on the axes. The limitations imposed on the axes include upper limit and lower limit for the x and y axes of the viewport. At process block 240, view slice sizes for the one or more view slices associated with the one or more slices is computed based on the viewport. At process block 245, memory space for the one or more view slices is allocated in the second memory.

In an embodiment a new viewport is determined if the axes dimensions are altered. When the axes dimensions are altered, the viewport size increases or decreases accordingly. In another embodiment, the new viewport is reloaded to the second memory. In case the viewport is increased, the increased portion of the viewport is moved to the second memory.

FIG. 3A is an exemplary business scenario for optimizing data transfer time in a graphics processor unit according to an embodiment of the invention. A user interface 300 illustrates the viewport 305 displaying data for sales revenue based on geography, product, time and distribution channel. Column 310 includes geographic locations USA, Canada and Mexico. Column 315 includes products, namely keyboard and mouse. Column 320 includes time and column 325 includes distribution channels, namely online and retail. Column 330 includes sales revenue. In this scenario consider a user request to aggregate sales revenue for product "keyboard" according to geographic location "USA" for the time "first quarter of 2008".

Assuming that the OLAP cube includes products on the x-axis and geography on the y-axis and time on the z-axis, one or more slices associated with the user request is identified based on the axes dimensions, the filter dimensions, and the limitations imposed on the axes. In this scenario the axes dimensions are product and geography and the filter dimensions are time and distribution channel. This data can be visualized on a viewport. In this scenario, the viewport is a grid of product versus geographic location. The filter dimensions can alter the values displayed on the viewport.

The OLAP cube may include data as follows:

a. Online sales revenue of Product Keyboard from USA for January 2008—Rs. 5000/-
b. Retail sales revenue of Product Keyboard from USA for January 2008—Rs. 3000/-
c. Online sales revenue of Product Keyboard from USA for February 2008—Rs. 6000/-
d. Retail sales revenue of Product Keyboard from USA for February 2008—Rs. 5000/-
e. Online sales revenue of Product Keyboard from USA for March 2008—Rs. 4000/-
f. Retail sales revenue of Product Keyboard from USA for March 2008—Rs. 3000/-

Consider the user analyzing revenue earned from the online sales for the first quarter of 2008. One or more slices associated with the aggregation are identified. In this scenario the slices of the OLAP cube contain data of 'a', 'c' and 'e' illustrated above. The slices are visualized in a viewport to obtain corresponding view slices. The size of the view slices is limited to the viewport area. The viewport area is determined based on the axes dimensions, filter dimensions and the set of limitations imposed on the axes dimensions. According to this scenario the view slices will contain sales revenue for product keyboard for geographic location USA according to the OLAP cube data 'a', 'c' and 'e'. A memory with capacity equal to the size of the view slice is allocated in the second memory. The identified view slices are transferred to the second memory. The addresses of the identified slices are stored in lookup data structure. The lookup data structure may include but is not limited to a hash map table, Translation Look-Ahead Buffer (TLB) and the like. The user request for aggregation is transferred along with the identified slices. At a processor of the GPU the aggregation request is computed. The result obtained from the aggregation computation request is stored in the second memory. The result of the aggregation request is retrieved from the second memory and is displayed on the viewport of the graphical user interface. In an embodiment, the slices are identified for each filter dimension. For example, the above explained scenario includes two filter dimensions, namely time and distribution channel. The slices are identified based on both time and distribution channel as well.

In an embodiment, when the user requests for an aggregation, only the slice addresses are sent to the second memory, provided its address is available in the lookup data structure. If the address is not available in the lookup data structure, the slice is transferred to the second memory. This involves only a fraction of the data transfer time than the time required for transferring complete slices. The GPU de-references the slice addresses to fetch the slices from the device memory itself. The whole computation is done in the GPU and only the result is sent back to the first memory. Assuming 32-bit addresses and slice size of 400 cells each containing 32-bit data, the savings in data transfer time is 1:400.

Figure 3B:
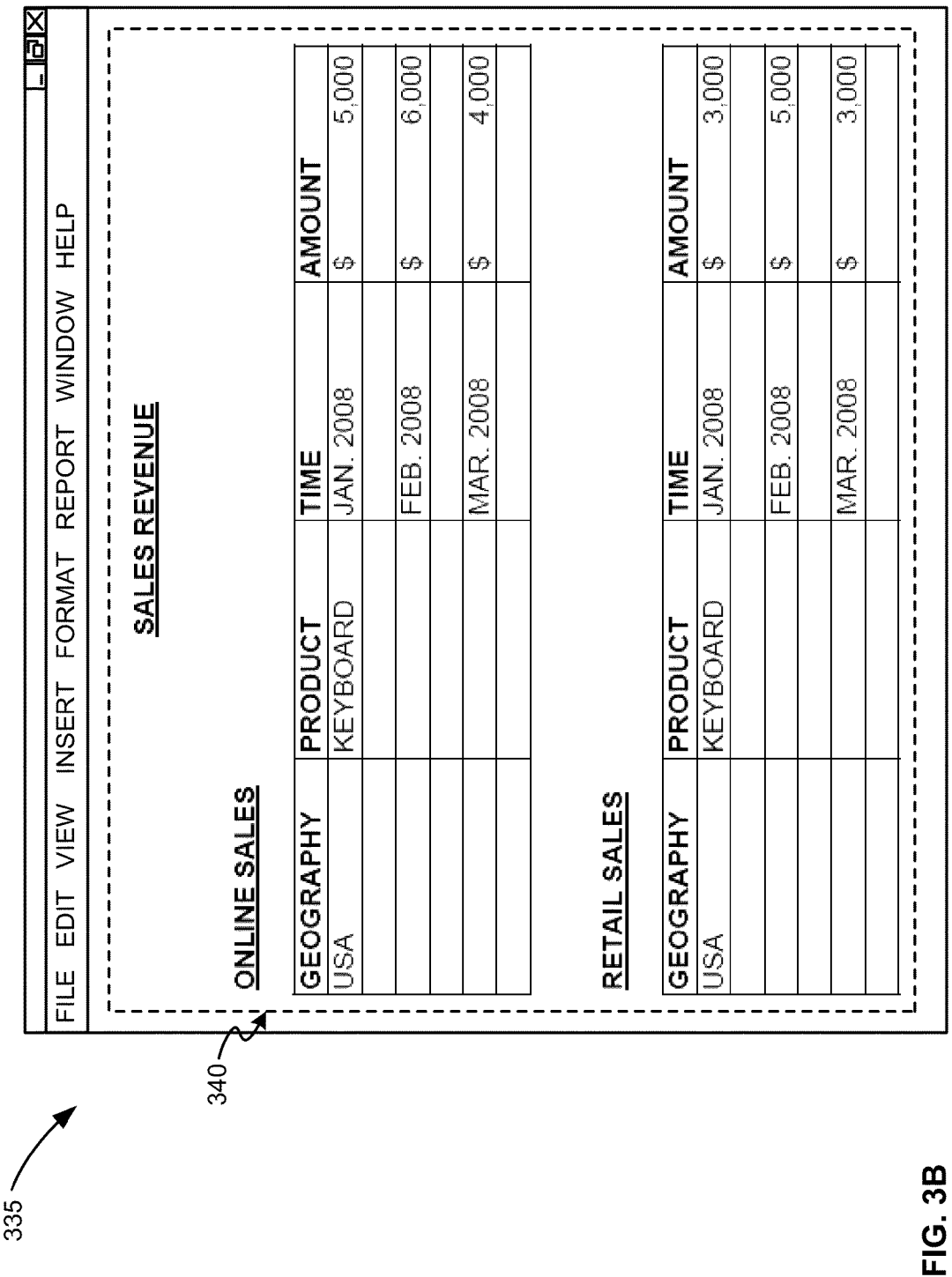
FIG. 3B is an exemplary business scenario for displaying data according to filter dimensions in a viewport according to an embodiment of the invention.

FIG. 3B is an exemplary business scenario for displaying data according to filter dimensions in a viewport according to an embodiment of the invention. The viewport 340 is displayed within a user interface 335. A first portion of viewport 340 displays data of a view slice associated with a user request to view the sales revenue of product keyboard according to geographic location USA for the first quarter of the year 2008 on applying "online sales" as a filter dimension.

A second portion of viewport 340 displays data of a view slice associated with a user request to view the sales revenue of product keyboard according to geographic location USA for the first quarter of the year 2008 on applying "retail sales" as a filter dimension.

Figure 4:
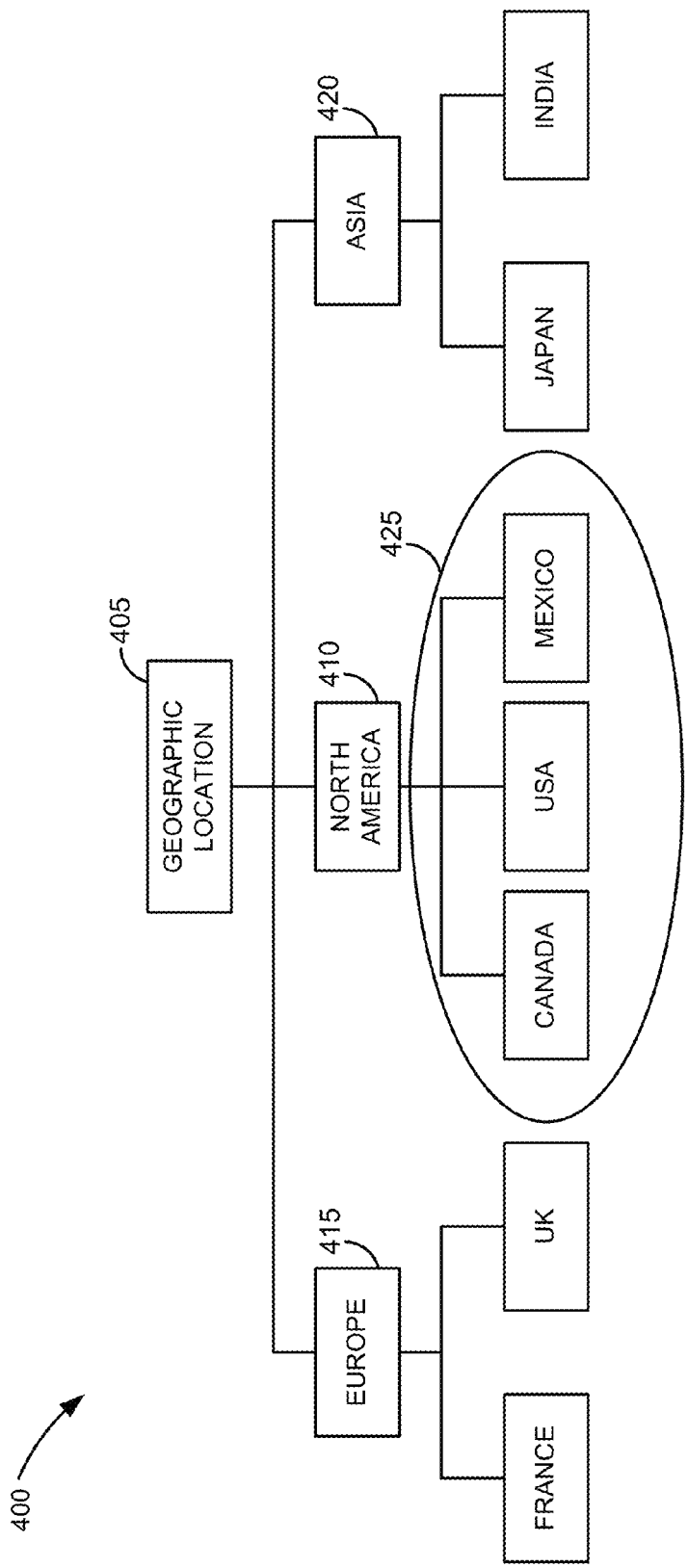
FIG. 4 is a block diagram illustrating an exemplary aggregation according to an embodiment of the invention.

FIG. 4 is a block diagram illustrating an exemplary aggregation according to an embodiment of the invention. Business scenario 400 illustrates aggregation computation for geographic location 405. Geographic location 405 includes continents North America 410, Europe 415 and Asia 420. The geographic location North America 410 further includes countries namely USA, Canada and Mexico. Consider a user request to analyze sales revenue for geographic location North America 410. Then slices of continent North America 410 that includes USA, Canada and Mexico are transferred to the second memory. These slices are aggregated in the processor of the GPU to obtain an aggregated slice 425 for geographic location North America 410. The aggregated slice 425 is stored in the second memory.

Figure 5:
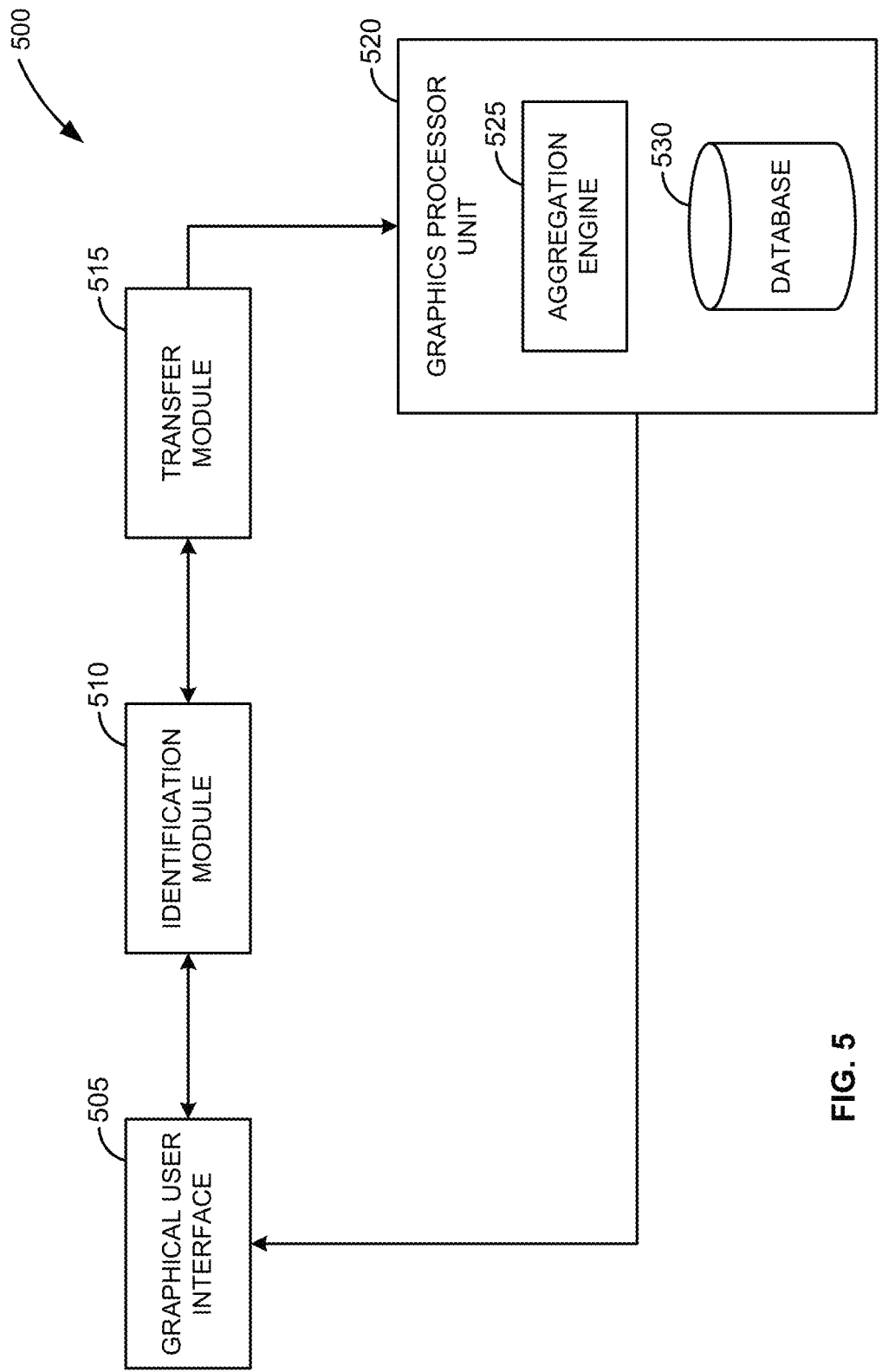
FIG. 5 is a block diagram of an exemplary system to optimize data transfer time of GPU according to an embodiment of the invention.

FIG. 5 is a block diagram of an exemplary system to optimize data transfer time of GPU according to an embodiment of the invention. At 500, a graphical user interface 505 receives a user request to perform online analytical processing computation. A first memory (not shown) includes an OLAP cube required for online analytical processing computation. The OLAP cube includes one or more slices associated with the user request. A lookup data structure in the main memory includes addresses of the one or more slices. An identification module 510 identifies one or more slices associated with the user request. The one or more identified slices are transferred to a second memory (not shown) using a transfer module 515. The identification module 510 identifies a viewport for the one or more slices based on axes dimensions and at least one filter dimension selected by a user. The identification module 510 also identifies a view slice for the one or more slices based on a viewport. A view slice size for the one or more view slices of the OLAP cube based on the viewport is computed by the identification module 510. The transfer module 515 allocates memory space for the one or more view slices in a second memory. The transfer module 515 also reloads a viewport if the axes and filter dimensions of the viewport are changed. An aggregation engine 525 in the GPU 520 aggregates the one or more identified slices to generate a result for the online analytical processing computation. A database 530 in a second memory (not shown) of the GPU 520 stores the result of the online analytical processing computation. In an embodiment, the first memory retrieves the result of the OLAP computation from the second memory. The graphical user interface 505 displays the result for the OLAP computation.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include computer code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with computer readable software instructions.

Figure 6:
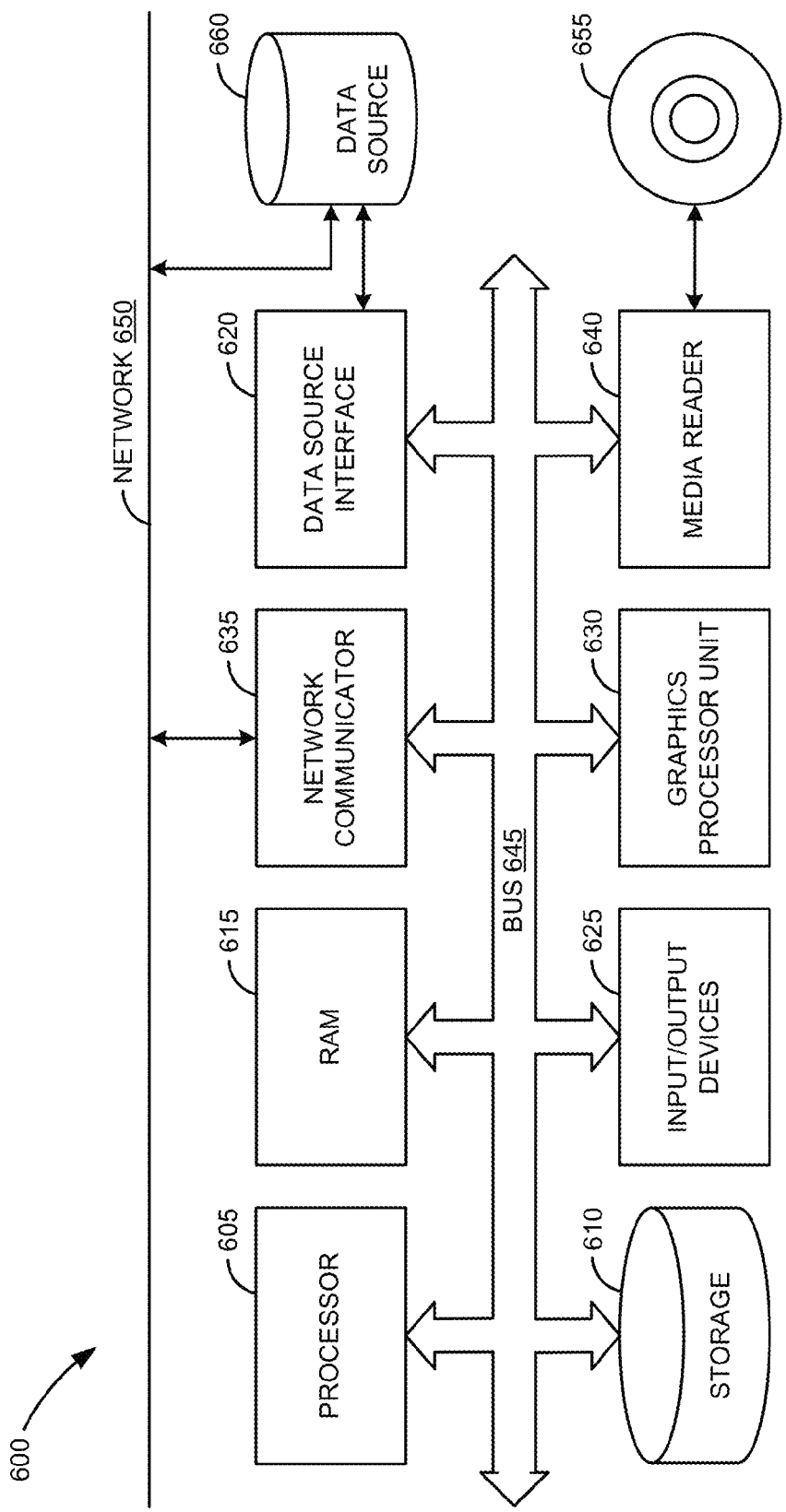
FIG. 6 is a block diagram of an exemplary computer system according an embodiment of the invention.

FIG. 6 is a block diagram of an exemplary computer system 600 according an embodiment of the invention. The computer system 600 includes a processor 605 that executes software instructions or code stored on a computer readable medium 655 to perform the above-illustrated methods of the invention. The computer system 600 includes a media reader 640 to read the instructions from the computer readable medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes one or more input and output devices 625. An output device (e.g., a display) provides at least some of the results of the execution as output including, but not limited to, visual information to users. An input device provides a user or another device with means for entering data and/or otherwise interacting with the computer system 600. Each of these input and output devices 625 could be joined by one or more additional peripherals to further expand the capabilities of the computer system 600. A graphics processor unit 630, suitable for incorporation into OLAP computations is included in computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture, comprising:
a non-transitory computer readable storage medium comprising instructions which when executed by a computer cause the computer to perform operations comprising:
receiving a user request to perform online analytical processing computation, the user request comprising axes dimensions and filter dimensions associated with a visualization for an online analytical processing cube, wherein the online analytical processing cube is stored in a first memory associated with a central processing unit (CPU);
based on the axes dimensions and filter dimensions in the user request, identifying one or more view slices at the first memory associated with the CPU;
receiving a set of limitation on the axes dimensions, wherein the set of limitations is associated with the visualization;
based on the axes dimensions, the filter dimensions, and the set of limitations, identifying a viewport for the one or more view slices, wherein the view slice corresponds to a portion of a slice of the online analytical processing cube displayed in the viewport;
computing a view slice size for the one or more identified view slices; and
based on the computed view slice size, allocating memory space for the one or more identified view slices in a second memory;
based on computing, transferring the one or more identified view slices to the second memory in a graphics processor unit;
storing addresses of the one or more identified view slices in a lookup data structure at the first memory;
based on the user request, sending the stored addresses of the one or more identified view slices from the lookup data structure at the first memory to the second memory in the graphics processor unit;
based on de-referencing the stored addresses at the second memory, fetching the one or more transferred view slices from the second memory;
performing the online analytical processing computation on the one or more fetched view slices at the second memory in the graphics processor unit; and
retrieving a result of the online analytical processing computation from the second memory.

2. The article of manufacture of claim 1, wherein determining the viewport comprises determining a new viewport if the axes dimensions are altered.

3. The article of manufacture of claim 2, wherein determining the new viewport comprises reloading a portion of the new viewport to the second memory.

4. The article of manufacture of claim 1, wherein the online analytical processing computation comprises an aggregation.

5. The article of manufacture of claim 1, wherein the lookup data structure comprises a hash map table.

6. A computer system for optimizing data transfer time, the computer system comprising:
a graphical user interface for receiving a user request to perform online analytical processing computation, the user request comprising axes dimensions and filter dimensions associated with a visualization for an online analytical processing cube, wherein the online analytical processing cube is stored in a first memory associated with a central processing unit (CPU);
a processor;
an identification module executable on the processor to identify one or more view slices at the first memory associated with the CPU, based on the axes dimensions and filter dimensions in the user request;
receive a set of limitation on the axes dimensions, wherein the set of limitations is associated with the visualization;
the identification module to identify a viewport for the one or more view slices based on axes dimensions, the set of limitations and filter dimensions, wherein the view slice corresponds to a portion of a slice of the online analytical processing cube displayed in the viewport;
the identification module to compute a view slice size for the one or more identified view slices;
based on the computed view slice size, a transfer module to allocate memory space for the one or more identified view slices in a second memory;
based on computing, the transfer module to transfer the one or more identified view slices to the second memory in a graphics processor unit;
storing addresses of the one or more identified view slices in a lookup data structure at the first memory;
based on the user request to aggregate, sending the stored addresses of the one or more identified view slices from the lookup data structure at the first memory to the second memory in the graphics processor unit;
based on de-referencing the stored addresses at the second memory, fetching the one or more transferred view slices from the second memory;
an aggregation engine in the graphics processor unit to aggregate the one or more fetched view slices to generate a result at the second memory for the online analytical processing computation; and
a database in the second memory to store the result of the online analytical processing computation.

7. The computer system of claim 6, wherein the transfer module reloads a viewport if the axes dimensions of the viewport are changed.

8. The computer system of claim 6, wherein the first memory retrieves the result of the online analytical processing computation from the second memory.

9. The computer system of claim 6, wherein the graphical user interface displays the result for the online analytical processing computation.

10. A computer implemented method for optimizing data transfer time in a computer, the method comprising:
receiving a user request to perform online analytical processing computation, the user request comprising axes dimensions and filter dimensions associated with a visualization for an online analytical processing cube, wherein the online analytical processing cube is stored in a first memory associated with a central processing unit (CPU);
the computer, based on the axes dimensions and filter dimensions in the user request, identifying one or more view slices at the first memory associated with the CPU;
receiving a set of limitation on the axes dimensions, wherein the set of limitations is associated with the visualization;
the computer, based on the axes dimensions, the filter dimensions, and the set of limitations, identifying a viewport for the one or more view slices, wherein the view slice corresponds to a portion of a slice of the online analytical processing cube displayed in the viewport;
the computer, computing a view slice size for the one or more identified view slices;
based on the computed view slice size, allocating memory space for the one or more identified view slices in a second memory;
based on computing, transferring the one or more identified view slices to the second memory in a graphics processor unit;
storing addresses of the one or more identified view slices in a lookup data structure at the first memory;
the computer, based on the user request, sending the stored addresses of the one or more identified view slices from the lookup data structure at the first memory to the second memory in the graphics processor unit;
the computer, based on de-referencing the stored addresses at the second memory, fetching the one or more transferred view slices from the second memory;
the computer, performing the online analytical processing computation on the one or more fetched view slices at the second memory in the graphics processor unit; and
retrieving a result of the online analytical processing computation from the second memory.

11. The computer implemented method of claim 10, wherein determining the viewport comprises determining a new viewport if the axes dimensions are altered.

12. The computer implemented method of claim 11, wherein determining the new viewport comprises reloading a portion of the new viewport to the second memory.

13. The article of manufacture in claim 1, further comprising instructions which when executed by the computer cause the computer to:
upon determining that the lookup data structure does not include the addresses of the one or more view slices, transferring the one or more identified view slices to the second memory.

14. The computer system of claim 6, further comprises:
upon determining that the lookup data structure does not include the addresses of the one or more view slices, transferring the one or more identified view slices to the second memory.

15. The computer implemented method of claim 10, further comprising:
upon determining that the lookup data structure does not include the addresses of the one or more view slices, transferring the one or more identified view slices to the second memory.

* * * * *